Patented May 12, 1931

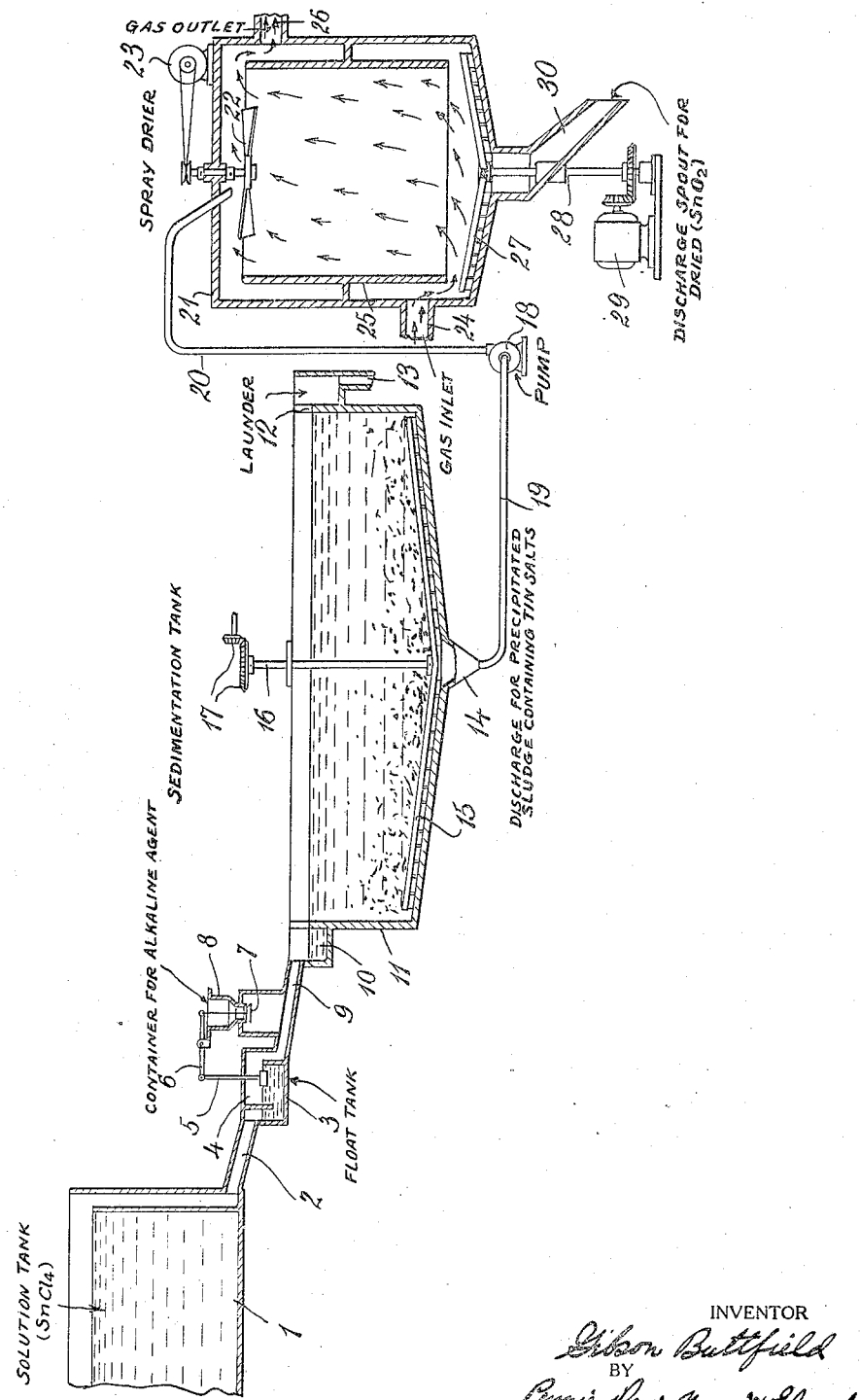

1,804,551

UNITED STATES PATENT OFFICE

GIBSON BUTTFIELD, OF ROCKVIEW HEIGHTS, NORTH PLAINFIELD, NEW JERSEY, ASSIGNOR TO THE VULCAN DETINNING COMPANY, OF SEWAREN, NEW JERSEY, A CORPORATION OF NEW JERSEY

RECOVERY OF TIN COMPOUNDS

Application filed April 28, 1927. Serial No. 187,164.

This invention relates to the recovery of tin from acid liquors containing relatively small quantities of tin, and has for its object the provision of an improved process for recovering tin from such liquors. More particularly, the invention aims to provide an economic process for the recovery of tin from the wash waters or liquors of the silk weighting industry.

The weighting of silk is accomplished by treatment of the silk in various solutions, among which is a solution of tin tetrachloride ($SnCl_4$) in water. The silk while in the solution of tin tetrachloride absorbs tin in the form of tin hydrate and the formation of free hydrochloric acid results. The hydrolysis of tin tetrachloride may be indicated by the following reaction:

$$SnCl_4 + 4H_2O = Sn(OH)_4 + 4HCl.$$

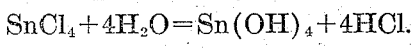

Upon the completion of the weighting treatment, the silk is thoroughly washed with water to remove the adhering tin tetrachloride and hydrochloric acid. The waste liquors from this washing operation therefore contain tin tetrachloride and hydrochloric acid, and my present invention is particularly directed to the recovery of tin from these liquors.

One of the great difficulties in the efficient recovery of tin from the wash waters or liquors of silk weighting operations is due to the fact that it is necessary to use enormous quantities of water in washing the silk, amounting in a number of instances to from one to four million gallons daily. While the percentage tin content of such wash water is small the total amount of tin to be salvaged amounts in value to several million dollars per annum in the United States alone. The tin contained in the wash waters is approximately one third of the total amount of tin used by the silk weighting industry, estimated at over 7,500 tons or more per annum. It is therefore apparent that the efficient recovery of 2,500 tons of metallic tin is of supreme importance to the silk weighting industry and of great economic necessity in the present day shortage of tin.

The heretofore customary procedure for the recovery of tin from the wash waters of the silk weighting industry is substantially as follows: The wash water upon leaving the wash machine in which tin tetrachloride and hydrochloric acid are rinsed from the silk is pumped or allowed to flow to rectangular concrete settling pits. These pits are equipped so that the wash water enters them continuously at one end and discharges continuously at the opposite end. During the period of time required for the wash water to flow from the wash machines to the exit from the settling pits some of the tin is precipitated out of the solution, due to the well known fact that on excessive dilution tin is partially precipitated from a solution of tin tetrachloride and this precipitate settles to the bottom of the settling pits. In some instances the wash water flows over a bed of limestone for the purpose of neutralizing in part its acidity thus causing more complete precipitation of the tin in solution. However, due to incomplete intermingling of the wash water with the limestone and lack of control of the amount of lime dissolved by the wash water complete neutrality is never attained and constant loss of unprecipitated tin results.

The wash water is permitted to flow through the settling pit until the settled tin-bearing precipitate, hereinafter termed "sludge", has built up to such an extent that the velocity of the wash water through the pit is increased, due to decreased flow space in the pit, to such a degree that abnormal amounts of the tin in suspension are carried out at the exit end of the pit and thus lost. Instances have been found where such effluent contained .03 grams of tin per liter.

When this condition is reached the wash water is by-passed from the one settling pit or group of such pits into and through another similar pit or group of pits; the wash water above the sludge is pumped off and discharged until the surface of the sludge has been reached. The sludge is then pumped to a storage tank from which it is fed to a filter press. The cake from the filter press is dried by means of the usual kiln, tray or rotary drier, thus furnishing a dry tin compound in the form of tin oxide which is ready for smelting.

The difficulties, losses and inefficiencies necessarily incurred in the foregoing procedure are numerous, some of which are as follows: Complete precipitation of the tin in solution is not attained due to incomplete neutralization because of uncontrolled addition of lime. Moreover, although tin precipitates on dilution of tin tetrachloride solutions, the reaction is slow and incomplete, especially in the presence of an appreciable amount of free acid. The pumps, pipe lines, pits, etc., disintegrate under the action of the unneutralized acid; and the presence of iron, disintegrated concrete, etc., in the sludge, and hence in the dried material, reduces the value of the dried material in that such impurities materially affect the tin recoverable in smelting. A duplication of settling pits is necessary, entailing heavy additional expense and extra space. Pumping the sludge from the settling pits is difficult and the suction pipe to the pump must be fed by hand due to the fact that the precipitated material settles into too pasty a sludge to flow. The water immediately above the level of the sludge in the settling pit contains more hydrous tin oxide than that nearer the surface. Furthermore pumping off the water to or nearly to the surface of the sludge agitates the sludge and thus a dual loss of a considerable amount of the hydrous tin oxide results. The filter presses entail high maintenance and labor costs and reduce the moisture content of the sludge not more than 10% leaving at least 80% moisture in the filter cake. The drying of the filter cake in the various types of dryers in common use is inefficient and slow due largely to the fact that the material while drying becomes coated with a substantially impervious layer of semi-dried material which even though spread out in thin layers, greatly retards the evaporating action of heat. Since the filter cake contains so high a percentage of moisture, the dryer when loaded to its capacity yields a comparatively small amount of dried material. Furthermore, since the precipitation and the settling, removing of sludge from settling pits, filter pressing, and drying are successive steps and neither coincident nor continuous operations, the time loss is great.

The object of the present invention is to obviate the aforementioned objections by providing a system of tin recovery which involves a series of processes employing novel apparatus whereby the tin may be recovered from tin-bearing acid liquors by precipitation of the tin oxide in a form readily available and useable for the recovery of the metallic tin.

The improved process of the invention in its preferred and complete aspect comprises three steps involving (1) the treatment of the tin-bearing acid liquor by adding an alkaline agent to a flowing stream of the liquor; (2) introducing the resulting mixture to a sedimentation tank in which the tin oxide settles as a heavy precipitate or sludge which is continuously withdrawn by mechanical means while the substantially clear supernatent liquid is removed by decantation; and (3) drying the sludge, preferably by a spray drier in which the sludge is sprayed into the path of a current of hot gases which remove the moisture from the spray and the tin oxide is recovered in the form of a finely divided dry mass; which may be subsequently smelted to obtain metallic tin. While these three steps as outlined are preferably combined to form a continuous process, it is to be understood that each step may be performed separately or in combination with either one or two of the other steps. For example, the sludge containing the tin oxide precipitate may be collected and stored for future use or transported to a remote drying and desiccating apparatus. Likewise, the tin oxide precipitation may be carried on separately.

Absolute neutrality or neutrality as nearly absolute as is possible is obtained by controlling the addition of the alkaline agent according to the volume of liquor flowing, inasmuch as the acid content of this liquor is virtually constant for a given process of operation. The neutralization of the liquor not only effects the precipitation of the tin oxide, but, as a result of this neutrality, disintegration of the pumps, pipe lines, tanks, concrete and the like, due to the action of the acid in solution, is eliminated and the purity of the finished product in the form of tin oxide is greater, because of the absence of impurities which have been heretofore present by the disintegration of the materials of the apparatus. Furthermore, the loss of sludge and tin containing material in suspension due to the drawing off or decantation of the solution above the level of the sludge, is eliminated by discharging the neutral solution by overflow from its own surface and removing the sludge from the bottom of the tank. Inasmuch as the control of the process may be made automatic after ascertaining the proper proportions of the neutralizing agent necessary, the process may be made continuous and requires little or no attention. Only one settling tank is required and thereby considerable saving in construction and maintenance is possible, inasmuch as the great number of settling tanks heretofore used is decreased to one, and the attention which each one of these settling tanks heretofore required is also decreased. This process of tin recovery may be carried on as a series of coincident operations in a continuous and automatic manner, and consequently it is economical in operating expense, attention and time. As pointed out heretofore, the several steps of the system may be carried on intermittently or separately or in conjunction with either one of the other steps as readily as the combination of sequential operations just mentioned.

In such other processes as aforementioned which employed the use of filter presses, kilns, tray or rotary driers, considerable expense and inefficiency resulted, and where filter presses were used, the subsequent treatment of the filter cake required additional expensive operations. In performing one of the steps of the present process, that of drying the sludge, the use of a spray drier is preferred as it is economical and produces the tin oxide in finely divided form, and in operating the spray drier the drying agent may be waste flue gases which may be bypassed from nearby furnaces, or the like. It has been observed that by increasing the concentration of the unsettled hydrous tin oxide in the sedimentation tank, the settling is more rapid and complete for the reason that particles of greater mass tend to carry down with them the smaller particles as well as any hydrous tin oxide in colloidal form. This greater concentration may be effected in the settling tank by returning a portion of the previously removed sludge to the settling tank. This added mass of sludge assists in precipitating the smaller particles of hydrous tin oxide and is recoverable without waste inasmuch as it is foreign to the solution, having been previously precipitated therefrom.

For a better understanding of the invention, reference is made to the accompanying drawing in which a diagrammatic cross-section of a preferred apparatus for effecting the process of this invention is illustrated.

In the drawing 1 designates a tank or receptacle containing the tin-bearing acid liquor from which the tin is to be recovered. This liquor flows from the tank 1 by way of a conduit 2 into a float tank 3, upon the surface of the liquor in which rides a float 4 so as to rise and fall with the supply of liquor flowing from the tank 1. Connected to the float 4 by means of an arm 5 is a pivot lever 6 which controls a valve 7 so as to regulate the flow of the alkaline agent from a container 8. The alkaline agent may advantageously be a slurry of lime, that is, finely-divided lime suspended in water. Other alkaline agents which are dry, liquid or completely soluble in water, such as soda ash, may be used. The supply of the alkaline agent flowing from the container 8 by way of the valve 7 is controlled proportionately to the volume of liquid flowing through the conduit 2 by means of the float 4. The proper ratio of quantity of agent to the volume of liquid must be predetermined in order to obtain substantially absolute neutralization of the acid solution. After this has been determined, the amount of agent required for such neutralization is directly proportional to the volume of the acid liquid flowing through the float tank 3. The liquor and alkaline agent are mixed in chamber or conduit 9 and the resultant mixture flows through inlet gate 10 and passes into a sedimentation tank 11. It is preferable that the alkaline agent be added at a distance from the sedimentation tank for the reason that the resultant hydrous tin oxide in water loses water, thus raising its specific gravity and, therefore, in order to obtain the most rapid settling of the material in suspension, it is well to add the agent at some distance from the settling tanks in order that it may lose the water of constitution.

The neutralization of the acid liquor results in precipitation of the hydrous tin oxide which settles in the bottom of the sedimentation tank 11 in the form of a heavy sludge, whereas the supernatant liquor flows off by decantation through overflow gate or launder 12 to a discharge 13. The inflow of the sludge bearing liquor through conduit 9 and the outflow of the supernatant liquor being continuous, the contents of the sedimentation tank 11 is continually replenished and the precipitation of the hydrous tin oxide is a continuous process.

The sludge of hydrous tin oxide settling on the bottom of the tank 11 is impelled to a central discharge opening 14 by a series of plows or rakes 15 radially attached to a central rotatable shaft 16 driven by a pair of bevelled gears 17 from any suitable source of power not shown. Any suitable pump, such as the sludge pump 18 shown in the drawing, conveys the sludge from the discharge 14 by way of pipes 19 and 20 into a spray drier 21, or into storage tanks, conveyors or the like.

In the spray drier 21, the sludge is preferably discharged from the pipe 20 upon a rotating wheel or spreader 22 journalled in the top of the drier and driven by any suitable means such as motor 23. The sludge is spread from the rotating wheel 22 so as to fall downwardly as a spray through the interior of the drier. In falling downwardly, the finely-divided sludge encounters a current of hot air or hot gases circulating through the drier and entering through pipe 24 and leaving through pipe 26. The contact between the hot air or hot gas and the spray of sludge causes the entrained moisture to be carried off by the gas as it flows out of pipe 26. If desired the gases may be introduced through the pipe 26 and exit through the pipe 24. These hot gases may conveniently be the waste gases from a furnace or other heating device forming part of the adjacent plant. The finely divided tin oxide falls to the bottom of the spray drier 21 to be collected and impelled to a central discharge opening by means of a series of radial plows or rakes 27 mounted on a central shaft 28 which is driven by any suitable means such as motor 29. The dry, finely divided tin oxide is collected from a spout 30 in a substantially pure form, and in a state suitable for immediate smelting for the recovery of metallic tin.

The various steps in the process as hereinbefore described may obviously be divided, as for example, by storing the sludge for future use or transporting it to a remote drying apparatus, or the like. Furthermore, it is not the intention of the present specification to limit the invention to a spray drying operation since other methods of dehydrating or drying the sludge may be employed. The spray drier is an economic and particularly advantageous piece of apparatus for the purposes of the invention, because by its use the sludge may be immediately dried and is recoverable in the form of a desiccated tin oxide which requires no further breaking up or comminution prior to smelting.

A portion of the sludge which has been removed from the settling tank 11 may be returned to the settling tank in order to obtain a greater concentration of the unsettled hydrous tin oxide in suspension in the tank. The greater concentration causes a more rapid settling of the precipitate and this settling carries with it the smaller particles of tin oxide which might otherwise remain in suspension for a considerable length of time, as well as such hydrous tin oxide which remains in colloidal form. Due to the fact that the sludge can be removed continuously from the settling tank 11, the concentration of the hydrous tin oxide therein can be continuously raised and maintained at any desired degree by simply circulating a portion of the previously removed sludge through the tank.

The process of the invention presents numerous advantages over those heretofore employed, the most important advantage being that the process is flexible in operation so that it may be continuous and automatic, the various steps in the operation being performed coincidently but independently or the process may be intermittent, the various steps being performable separately and at different times if desirable. By adjusting the float control to admit a sufficient amount of alkaline agent or precipitant to effect absolute neutralization of a specific amount of liquor, complete neutralization of any volume of liquor flowing within the limits of capacity of the apparatus is continuously and automatically effected. The present process operates at considerable less time than those heretoused, in fact in one-third the time. By employing the spray drier for drying the sludge, the use of filter presses is obviated as well as the attention required for operating these filter presses. Furthermore, the filter cake discharged by filter presses becomes encrusted with a layer of dried material which is virtually impervious to air and thereby keeps the interior of the filter cake moist for indefinite periods of time. Also, in the use of the spray drier, waste gases from furnaces may be employed which is a considerable saving in fuel and obviates the expense and labor necessary in operating other drying devices. In operating the entire system, the only additional material necessary is the alkaline agent which, however, is very inexpensive and the amount used is relatively small. In some instances the velocity of the hot gases passing through the spray drier might remove some of the finely divided tin oxide and for that reason a mechanical separator of the baffle type may be placed in the discharge tube 26, but in general it will be found that the tin oxide is heavy enough to fall directly to the bottom of the drier housing and be otherwise undisturbed by the flowing hot gases.

I claim :—

1. The process of recovering a tin compound from a tin-bearing acid liquor from which a tin compound is precipitated upon neutralization, which comprises subjecting the tin compound content of the liquor to a sequence of continuous treatment operations involving precipitation of a tin compound by substantial neutralization of the acidity of the liquor with a suitable alkaline agent, the mixture being thoroughly mixed to effect neutralization throughout followed by collection of the resulting tin compound precipitate in the form of a sludge, and the drying of the sludge to a desired extent.

2. The process of recovering a tin compound from a tin-bearing acid liquor from which a tin compound is precipitated upon neutralization, which comprises supplying the liquor in a substantially continuous manner to a sedimentation and decantation apparatus, and subjecting the liquor to the action of an alkaline agent continuously supplied thereto in amount calculated to effect substantially complete neutralization of the acidity of the liquor undergoing sedimentation and decantation.

3. The process of recovering a tin compound from a tin-bearing acid liquor from which a tin compound is precipitated upon neutralization, which comprises supplying the liquor in a substantially continuous manner to a sedimentation and decantation apparatus, and adding to the liquor prior to its introduction into said apparatus an alkaline agent continuously supplied to the liquor in amount calculated to effect substantially complete neutralization of the acidity of the liquor undergoing sedimentation and decantation.

4. The process of recovering a tin compound from a tin-bearing acid liquor from which a tin compound is precipitated upon neutralization, which comprises treating the liquor with an alkaline agent to effect substantial neutralization of the acidity of the liquor, and subjecting the resulting liquor to sedimentation and decantation in the course of which an effluent substantially free of tin compound is decanted and a tin-containing precipitate settles out and is mechanically moved towards an outlet from which it is discharged in the form of a sludge.

5. A continuous process of recovering a tin from a tin-bearing acid liquor from which a tin compound is precipitated upon neutralization, which comprises treating the liquor with an alkaline agent in a substantially continuous manner and under such conditions of control as to effect substantially complete neutralization of the acidity of the liquor, subjecting the substantially neutralized liquor to sedimentation and decantation in the course of which an effluent substantially free of tin compound is continuously decanted and a tin-containing precipitate settles out and is mechanically moved towards an outlet from which it is continuously discharged in the form of sludge, and subjecting the sludge as continuously discharged to a spray drying operation and thereby obtaining a dried product containing the recovered tin.

6. The process of recovering a tin compound from a tin-bearing acid liquor from which a tin compound is precipitated upon neutralization, which comprises adding an alkali to said liquor and substantially neutralizing the acidity thereof, controlling the supply of alkali added in proportion to the degree of acidity and the volume of the liquor, decanting the supernatant liquor from the resulting tin bearing precipitate, and drying the precipitate.

7. The process of recovering a tin compound from a tin-bearing acid liquor from which a tin compound is precipitated upon neutralization, which consists in continuously adding to a flowing stream of said liquor an alkaline agent in amount proportional to the degree of acidity and the volume of flowing liquor, collecting the resulting tin bearing precipitate by sedimentation and removing the supernatant liquor by decantation.

8. The improvement in the process of recovering a tin compound from a tin-bearing acid liquor which comprises continuously effecting substantially complete neutralization of a flowing stream of the liquor by continuously adding to said flowing stream of liquor an alkaline agent in controlled amount.

9. The improvement in the process of recovering a tin compound from a tin-bearing acid liquor which comprises continuously adding an alkaline agent to a continuously supplied volume of the liquor in amount calculated to effect substantially complete neutralization of the acidity of the liquor.

10. The improvement in the process of recovering a tin compound from a tin-bearing acid liquor which comprises neutralizing the acidity of the liquor for precipitating the tin in the form of stannic hydroxide and collecting the tin bearing precipitate by continuous sedimentation and decantation.

11. The process of recovering a tin compound from a tin-bearing acid liquor which comprises sedimenting the tin bearing precipitate in the form of stannic hydroxide produced by neutralizing the acid liquor, and subjecting the resulting sediment to spraying and concurrent drying.

12. The process of recovering a tin compound from a tin-bearing acid liquor which comprises neutralizing the acid of the liquor to obtain a precipitate of stannic hydroxide, separating the resulting precipitate of stannic hydroxide in the form of a sludge from the supernatant liquor, and spraying and concurrently drying the precipitate.

In testimony whereof I affix my signature.

GIBSON BUTTFIELD.